(12) United States Patent
Watanabe et al.

(10) Patent No.: US 7,640,276 B2
(45) Date of Patent: Dec. 29, 2009

(54) BACKUP SYSTEM, PROGRAM AND BACKUP METHOD

(75) Inventors: Satoru Watanabe, Kokubunji (JP); Yoshio Suzuki, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 11/132,175

(22) Filed: May 19, 2005

(65) Prior Publication Data

US 2006/0224639 A1 Oct. 5, 2006

(30) Foreign Application Priority Data

Mar. 29, 2005 (JP) ............................. 2005-094071

(51) Int. Cl.
*G06F 17/30* (2006.01)
(52) U.S. Cl. ................. 707/202; 707/204; 711/133; 711/136
(58) Field of Classification Search ................. None
See application file for complete search history.

(56) References Cited

U.S. PATENT DOCUMENTS

| | | | | |
|---|---|---|---|---|
| 4,878,167 | A | * | 10/1989 | Kapulka et al. ............... 714/16 |
| 5,546,559 | A | * | 8/1996 | Kyushima et al. ............ 711/133 |
| 5,644,698 | A | * | 7/1997 | Cannon ........................... 714/6 |
| 5,951,695 | A | * | 9/1999 | Kolovson ..................... 714/16 |
| 6,065,018 | A | * | 5/2000 | Beier et al. .................. 707/202 |
| 6,226,651 | B1 | * | 5/2001 | Masuda et al. ............... 707/202 |
| 6,493,721 | B1 | * | 12/2002 | Getchius et al. ........... 707/104.1 |
| 6,542,906 | B2 | * | 4/2003 | Korn ........................... 707/203 |
| 6,604,183 | B2 | * | 8/2003 | Beaven et al. ............... 711/170 |
| 6,681,295 | B1 | * | 1/2004 | Root et al. ................... 711/128 |

(Continued)

FOREIGN PATENT DOCUMENTS

JP 0543582 A1 5/1993

(Continued)

OTHER PUBLICATIONS

"Evaluation of Remote Backup Algorithms for Transaction-Processing Systems" by C. Polyzois, et al. pp. 423-449, vol. 19, No. 3, Sep. 1994.

(Continued)

*Primary Examiner*—Neveen Abel Jalil
*Assistant Examiner*—Christyann R Pulliam
(74) *Attorney, Agent, or Firm*—Brundidge & Stanger, P.C.

(57) ABSTRACT

Provided is a backup method including a step (S1) of reading a log which is a data update difference, and identifying a data storage area (page) of backup data, a step (S2) of determining high/low reusability of the identified data storage area, a step (S3) of storing a log corresponding to a data storage area determined to be low in reusability in a log storage area preset on a memory, and a step (S4) of applying a log corresponding to a data storage area determined to be high in reusability to the identified data storage area in a cache area set on the memory, and updating the data storage area. Thus, by further reducing the number of I/O times in an external storage system of a standby system which backs up data by log transfer, it is possible to reduce introduction costs of a backup system and its normal-time operation's costs at normal times.

12 Claims, 10 Drawing Sheets

U.S. PATENT DOCUMENTS

| | | | |
|---|---|---|---|
| 6,832,227 B2* | 12/2004 | Seki et al. | 707/101 |
| 7,120,770 B2* | 10/2006 | Watanabe et al. | 711/162 |
| 7,194,486 B2* | 3/2007 | Ishikawa et al. | 707/200 |
| 7,194,675 B2* | 3/2007 | Kawamura et al. | 714/798 |
| 7,243,115 B2* | 7/2007 | Manley et al. | 707/204 |
| 7,293,050 B2* | 11/2007 | Arakawa et al. | 707/204 |
| 7,305,578 B2* | 12/2007 | Baba et al. | 714/6 |
| 2002/0108017 A1* | 8/2002 | Kenchammana-Hoskote et al. | 711/113 |
| 2003/0182325 A1* | 9/2003 | Manley et al. | 707/204 |
| 2004/0260517 A1* | 12/2004 | Ding et al. | 702/186 |
| 2005/0193039 A1* | 9/2005 | Adiba et al. | 707/204 |
| 2005/0198456 A1* | 9/2005 | Watanabe et al. | 711/162 |
| 2005/0198552 A1* | 9/2005 | Baba et al. | 714/4 |
| 2005/0240732 A1* | 10/2005 | Crick et al. | 711/133 |
| 2005/0262170 A1* | 11/2005 | Girkar et al. | 707/204 |
| 2005/0268188 A1* | 12/2005 | Kawamura et al. | 714/723 |
| 2005/0283504 A1* | 12/2005 | Suzuki et al. | 707/202 |
| 2006/0059206 A1* | 3/2006 | Ushijima et al. | 707/200 |
| 2006/0085672 A1* | 4/2006 | Watanabe et al. | 714/6 |
| 2006/0242370 A1* | 10/2006 | Suzuki et al. | 711/162 |
| 2007/0203958 A1* | 8/2007 | Suzuki et al. | 707/204 |
| 2007/0226276 A1* | 9/2007 | Suzuki et al. | 707/204 |
| 2008/0208923 A1* | 8/2008 | Watanabe et al. | 707/202 |
| 2008/0229140 A1* | 9/2008 | Suzuki et al. | 714/2 |

FOREIGN PATENT DOCUMENTS

| | | |
|---|---|---|
| JP | 5-225074 | 9/1993 |
| JP | 2000-267936 | 9/2000 |
| JP | 2004-78746 | 3/2004 |

OTHER PUBLICATIONS

U.S. Appl. No. 10/930,832, filed Sep. 1, 2004, Suzuki et al.
U.S. Appl. No. 11/012,102, filed Dec. 16, 2004, Watanabe et al.

* cited by examiner

BACKUP SYSTEM, PROGRAM AND BACKUP METHOD

CLAIM OF PRIORITY

The present application claims priority from Japanese application JP 2005-094071 filed on Mar. 29, 2005, the content of which is hereby incorporated by reference into this application.

BACKGROUND

This invention relates to an improvement in a data backup system, and more particularly to a backup system suited to a database.

A database backup system that uses two computer systems has recently been in wide use. The database backup system creates data identical to that in one computer system, and saves the data to another computer system. A backup source computer system is called an active system (or primary site), and a backup target computer system is called a standby system (or secondary site). Data saved in the standby system is called backup data.

A log transfer system has been known as a database backup system based on a redundant system (see Cristos A. Polyzois, Hector Garcia-Molina, "Evaluation of remote backup algorithms for transaction processing systems", ACM transactions on Database Systems, Vol. 19, No. 3, published in September, 1994, p. 423 to p. 449).

The log transfer system transfers a data update record from the active system to the standby system, and creates backup data at the standby system. According to this log transfer system, data of the active system and the backup data of the standby system are made identical to each other at the stage of starting the backup. After the start of the backup, the data update record of the active system is transferred to the standby system.

The standby system updates the backup data based on the transferred data update record, and creates latest backup data.

In general, a computer system includes an external storage system. Data of the computer system is stored in the external storage system. The external storage system stores the data of the computer system, including a magnetic disk drive such as a hard disk drive or a disk array. There has been known an external storage system that has a copy function (remote copy) of copying data between two devices (see JP 2004-78746 A). This copy function transfers data via a network, and copies data from one external storage system to the other external storage system. By using the copy function, when data is added to an external storage system of the copy source, the same data is added to an external storage system of the copy target.

Backup by the log transfer system is implemented by using the copy function of the external storage system. The mechanism is as follows. When the backup is started, the data of the active system and the backup data of the standby system are made identical to each other. The copy function is used to perform a data update record, and any data update record added to the external storage system of the active system is copied to the external storage system of the standby system. The standby system creates latest backup data based on the copied data update record.

In the backup, a DB cache is set on a server memory of the standby system, the data is updated by its page unit, and the external storage system is accessed via the DB cache. This DB cache is used as follows when there is a write command in the external storage system.

(i) If a page of an update target has been read in the DB cache, this page is reused. If not read in the DB cache, a relevant page is read from the external storage system into the DB cache.
(ii) The page is updated.
(iii) The updated page is stored in the DB cache, thereby enabling its reuse.
(iv) When the data backup is finished, the page on the DB cache is written in the external storage system.

Thus, the number of I/O times in the external storage system is reduced by reusing the page on the DB cache. For technologies applicable to such a DB cache, see JP 5-225074 A and JP 2000-267936 A.

The capacity of the DB cache is limited because it is set on the memory of the server. When the capacity for reading pages becomes insufficient, it may become necessary to write those pages of the DB cache in the external storage system. However, the pages written from the DB cache into the external storage system cannot be reused by the DB cache. Thus, there has been a method known as a least recently used (LRU) system for selecting and writing a page of least reusability in an external storage system: a paging system for paging out a page with the longest unused time. According to this LRU system, a page of a longest passage of time after last reading/writing is determined to be lowest in reusability, and written in the external storage system.

SUMMARY

However, in the conventional example, the active system and the DB of the standby system must be operated at normal times and, to continue transactions in an emergency situation (disaster), a computer or an external storage system equivalent to the active system must be operated in the standby system. In reality, however, a possibility of wide disaster is only a few percentage of a reason for an overall stoppage. Thus, the configuration of a standby system equivalent to the active system at normal times causes a problem of an increase in introduction and running cots of the backup system.

In particular, in the backup system based on the log transfer, there is a difficulty of reducing the number of I/O times in the external storage system even if the DB cache is controlled by the LRU system or the like when data is generated by the standby system, consequently necessitating a high-performance external storage system. Thus, it is impossible to reduce introduction and running costs.

This invention has been made in view of the above problems, and therefore an object of this invention is to reduce introduction costs of a backup system and to reduce operation costs at normal times by further reducing the number of I/O times in an external storage system of a standby system for backing up data by log transfer.

In order to achieve the above object, this invention provides a backup method for causing a backup system to receive a log which is a data update difference, apply the log to backup data stored in a storage system, and update the backup data, the method including: reading the received log and identifying a data storage area (page) of the backup data targeted to be updated by the log; determining high/low reusability of the identified data storage area; storing a log corresponding to a data storage area determined to be low in reusability in a log storage area preset on a memory; and applying a log corresponding to a data storage area determined to be high in reusability to the identified data storage area in a cache area set on the memory and updating the data storage area.

Thus, according to this invention, the reusability of the data storage area (page) corresponding to the read log is determined, the data storage area of low reusability is temporarily stored in the log storage area, and only the data storage area of high reusability is read in the cache to execute log application. Thus, only pages of high reusability are stored in the cache area, the number of I/O times in the storage system can be greatly reduced, and a low-performance storage system can be employed. As a result, it is possible to reduce introduction costs of a backup system and its operation costs at normal times.

DETAILED DESCRIPTION OF THE PREFERRED EMBODIMENT

Hereinafter, an embodiment of this invention will be described with reference to the accompanying drawings.

Figure 1:
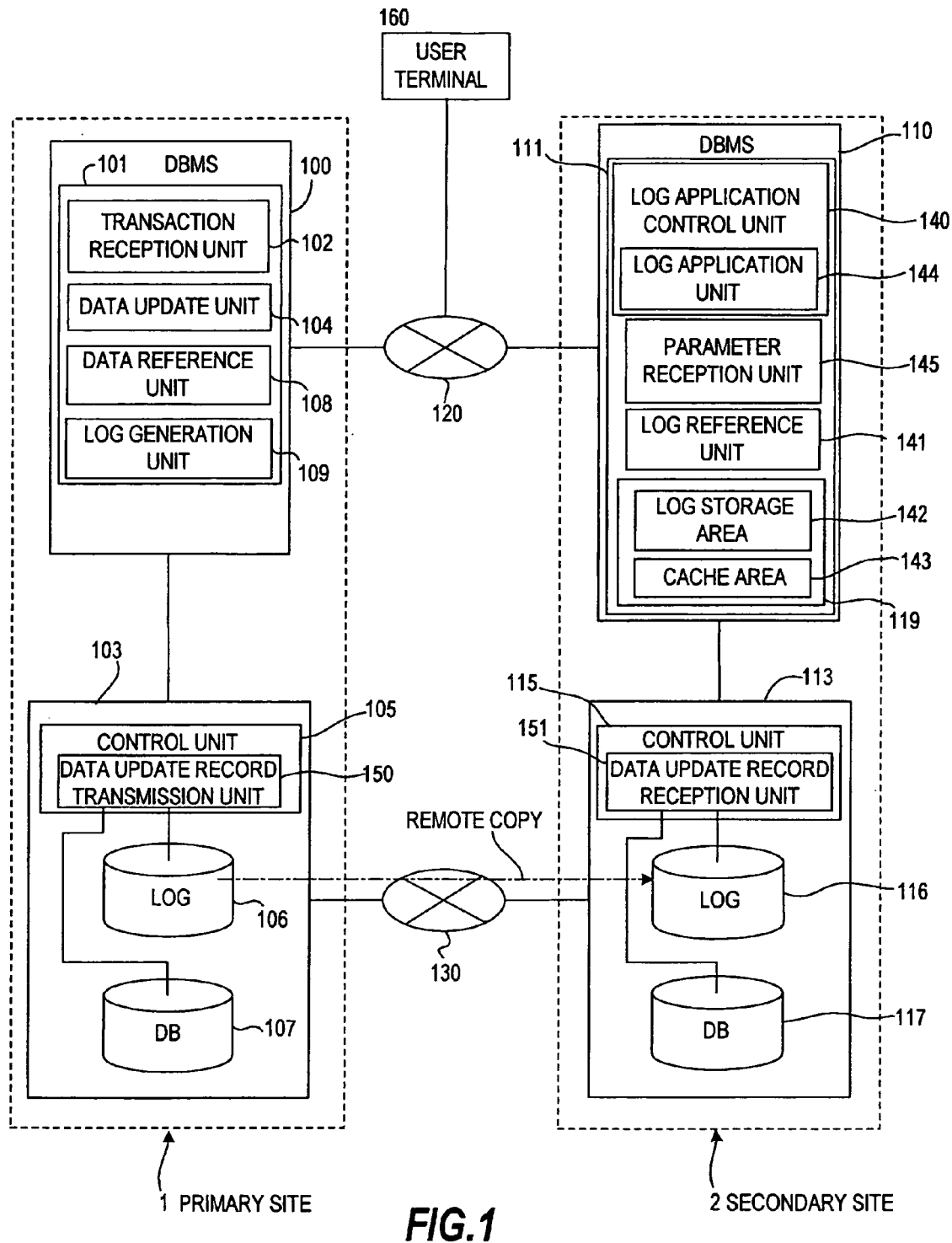
FIG. 1 is a system configuration diagram when disaster recoveries are carried out at two sites according to a first embodiment of this invention.

FIG. 1 is a block diagram of a typical backup system used by this invention, showing an example of backing up data between two (primary and secondary) sites.

Referring to FIG. 1, the backup system is configured to make a disaster recovery which transmits a log indicating an update difference of a primary database 107 of a primary site (active system) 1 to a secondary site (standby system) 2, and generates backup data (DB 117) of the primary database at the secondary site 2.

The primary site (active system) 1 includes a primary server 100 and a primary storage system 103 (primary external storage system). In the primary server 100, a primary database management system (DBMS) 101 is operated. This primary DBMS 101 (first DBMS) receives a transaction from a user terminal 160 or the like, and provides a primary database (DB) 107 (first database). The primary server 100 includes a CPU, a memory (not shown) and an interface with the primary storage system 103.

The primary server 100 (first server) is connected to a network 120 to communicate with the user terminal 160 and a secondary server 110 (second server, backup computer) of the secondary site.

The primary DBMS 101 manages the primary DB 107 stored in the primary storage system 103 connected to the primary server 100, and provides a transaction to the user terminal 160 or the like.

The primary DBMS 101 includes a data update unit 104 which updates a record of the primary DB 107 and stores the record in the primary storage system 103, a data reference unit 108 which reads the record of the primary DB 107, a transaction reception unit 102 which receives a transaction from the user terminal 160 or the like, and requests the data update unit 104 or the data reference unit 108 to update data or refer to data, and a log generation unit 109 which generates a log indicating an update difference of the updated data, and updates a log 106 of the primary storage system 103.

The primary DB 107 is stored in the primary storage system 103. However, direct access to the primary storage system 103 for each update or reference deteriorates performance. Thus, update or reference processing is normally carried out by a buffer (not shown) disposed on the memory of the primary server 100. The primary DBMS 101 reflects (writes) the update of the primary DB 107 in the primary storage system 103 when a transaction of the primary DB 107 is committed (completed) or when the buffer on the memory is filled. Additionally, the primary DBMS 101 generates an update difference of an updated record when the primary DB 107 is updated, and stores the update difference in the log 106 of the primary storage system 103.

The primary storage system 103 includes a hard disk device, a disk array or the like, and stores the primary DB 107 and the log 106. The primary storage system 103 includes a control unit 105 which controls reading/writing in the primary DB 107 or the log 106 in response to a request from the primary server 100. The control unit 105 is connected to a storage system network such as a storage area network (SAN) 130, whereby it can communicate with a secondary storage system 113 (secondary external storage system) of the secondary site 2. The control unit 105 of the primary storage system 103 includes a data update record transmission unit 150 which transmits (remote-copies), when the log 106 is updated, the updated log 106 to the secondary storage system 113 of the secondary site 2. The transmission of the log 106 to the secondary storage system 113 of the secondary site 2 can be carried out by asynchronous remote-copying in addition to the synchronous remote-copying. The primary storage system 103 and the primary server 100 are connected together via a network such as SAN or by I/O.

The secondary site 2 includes the secondary server 110 that causes a secondary DBMS 111 (second DBMS) to operate, the secondary storage system 113 that stores the log sent from the primary storage system 103 of the primary site 1 and a secondary DB 117 (second database) which is a copy of the primary DB 107, and the secondary DBMS 111 that generates/updates the secondary DB 117 based on the log 106 from the primary site 1.

The secondary DBMS 111 updates the secondary DB 117 stored in the secondary storage system 113 connected to the secondary server 110 based on a log 116 sent from the primary storage system 103. When a trouble occurs in the primary site 1, the secondary DBMS 111 provides a transaction to the user terminal 150 or the like. Accordingly, as in the case of the primary DBMS 101, the secondary DBMS 111 includes a transaction reception unit, a data update unit and a data reference unit (not shown).

The secondary DBMS 111 includes a log application control unit 140 which applies the log 116 stored in the secondary storage system 113 to update a record of the secondary DB 117, and stores the record in the secondary storage system 113, a log reference unit 141 which reads the log 116, a cache area 143 of a predetermined capacity set on a memory 119 of the secondary server 110, and a log storage area 142 similarly set on the memory 119.

Here, the cache area (DB cache) 143 set on the memory 119 of the secondary server 110 temporarily holds data of the secondary DB 117 by a page (data storage area) unit when the secondary DBMS 111 applies the log 116 to the secondary DB 117. The page of the DB 117 is set by the primary DBMS 101, and one of management units of data (DB 107 and DB 117) managed by the primary DBMS 101 is a page as describe below.

The log storage area 142 set on the memory 119 of the secondary server 110 temporarily holds only one of logs 116 corresponding to data of low reusability by an entry unit when the secondary DBMS 111 applies the log 116 to the secondary DB 117 and the backed-up secondary DB 117 is matched with the primary DB 107.

The secondary storage system 113 includes a hard disk, a disk array or the like, and stores the secondary DB 117 and the log 116. The secondary storage system 113 includes a control unit 115 which controls reading/writing in the secondary DB 117 or the log 116 in response to a request from the secondary server 110. The control unit 115 is connected to the storage system network such as the storage area network (SAN) 130, whereby it can communicate with the primary storage system 103 of the primary site 1. The control unit 115 of the secondary storage system 113 includes a data update record reception unit 151 which receives the log 106 sent from the data update record reception unit 150 of the primary storage system 103, and updates the log 116 of the secondary storage system 113. The secondary storage system 113 and the secondary server 110 are connected together via the network such as SAN or by I/O.

The secondary DB 117 is stored in the secondary storage system 113. However, performance is deteriorated if the secondary server 110 directly accesses the secondary storage system 113 for each update. Thus, the secondary DBMS 111 performs update processing of the secondary DB 117 in the cache area 143 disposed on the memory 119 of the secondary server 110.

The secondary DBMS 111 applies the log 116 to update the secondary DB 117 at a predetermined timing such as when the log 116 is updated or when the secondary DB 117 is recovered.

The log application control unit 140 of the secondary DBMS 111 includes a parameter reception unit 145 which receives parameter changing from the network 120 to enable changing of a parameter (threshold value or the like) used at the time of applying the log 116 from a user terminal 160 or the like. The parameter at the time of applying the log 116 is a fixed value A (first value) described below, the capacity of the log storage area 142 or the like, and such parameters can be changed via the parameter reception unit 145 from the user terminal 160 or the like.

<Outline of Log Application Control Unit>

Next, referring to FIG. 2, an outline of an operation of the log application control unit 140 of this invention will be described.

Figure 2:
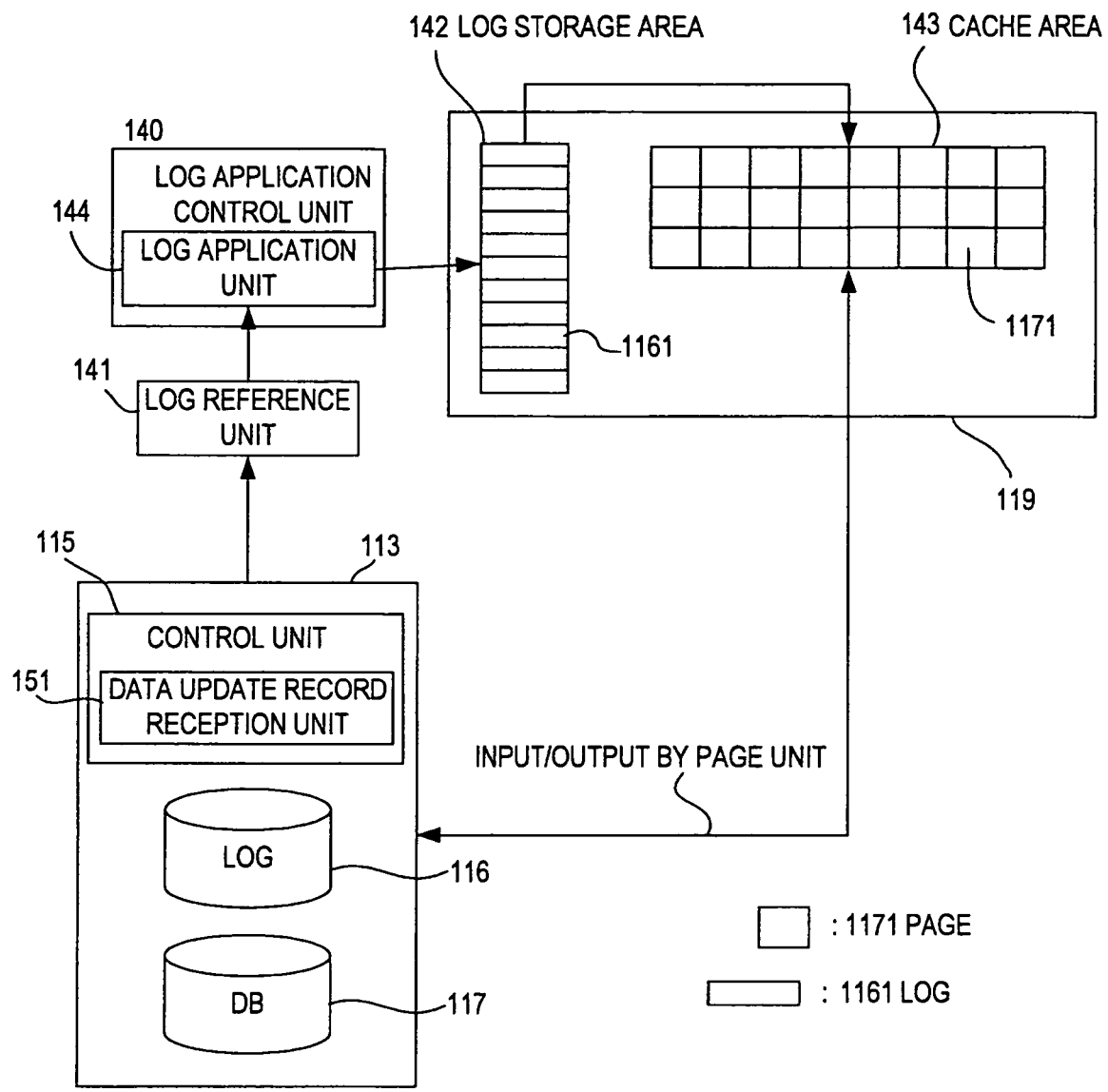
FIG. 2 is an explanatory diagram showing a log application process.

A basic operation of the log application control unit 140 shown in FIG. 2 is as follows. The log reference unit 141 reads log data 1161 of a sequential log 116 from the secondary storage system 113, and determination is made as to high/low reusability of a page 1171 indicated by the read log data 1161. The reusability indicates the number of repeated access times when the log is applied, and is decided by the volume or the number of log data 1161 indicating the same page 1171.

If the reusability is determined to be high, the page 1171 containing the data indicated by the log data 1161 is read from the secondary DB 117 to the cache area 143, the log data 1161 is applied to update the secondary DB 117, and contents are matched with those of the primary DB 107.

On the other hand, if the reusability is determined to be low, the log data 1161 is stored in the log storage area 142 different from the cache area 143. Then, the log data 1161 is read until there is no more free space in the log storage area 142, pages 1171 indicated by the log data 1161 are sequentially read from the secondary DB 117 in free spaces of the cache area 143, and the log data 116 is applied to update the secondary DB 117. If there is no more free space in the cache area 143, a page 1171 of a longest unused time is laid out by the LRU system of the conventional example to secure a free space. Thus, when the log data 1161 is read until there is no more free space in the log storage area 142, all the log data 1161 in the log storage area 142 are applied to the secondary DB 117. Then, all the log data 1161 are deleted from the log storage area 142, whereby new log data 1161 can be read from the log 116 in the log storage area 142.

In other words, the log data 1161 indicating a page of high reusability is quickly applied to update the secondary DB 117, and deleted from the log storage area 142. On the other hand, the log data 1161 indicating a page 1171 of low reusability is stored in the log storage area 142. Then, when there is no more free space in the log storage area 142, all the log data 1161 in the log storage area 142 are applied to the secondary DB 117 to update the same. The log data 1161 after the update completion is deleted from the log storage area 142.

In short, only the log data 1161 corresponding to the page 1171 of low reusability is stored in the log storage area 142, and only the page 1171 of high reusability is read in the cache area 143, and the logs are applied. Then, from a point of time when there is no more free space in the log storage area 142, in the free space of the cache area 143, the log data 1161 corresponding to the page 1171 of low reusability is applied to the secondary DB 117.

Accordingly, the page 1171 of high reusability is always held in the cache area 143. As a result, it is possible to suppress the number of times of accessing the secondary storage system 113 by the secondary server 110 when the secondary DB 117 is updated. Thus, the secondary storage system 113 can be constituted of a low-performance machine, thereby reducing introduction and normal-time operation's costs of the secondary site 2 which becomes a backup system.

<Details of Log Application Control Unit>

<Relation Between Log and Page>

Hereinafter, the log application control unit 140 will be described in detail. First, description will be made of a relation between structures of the log 106 of the primary DBMS 101 and the backed-up log 116 and the pages of the primary DB 107 and the secondary DB 117.

Figure 3:
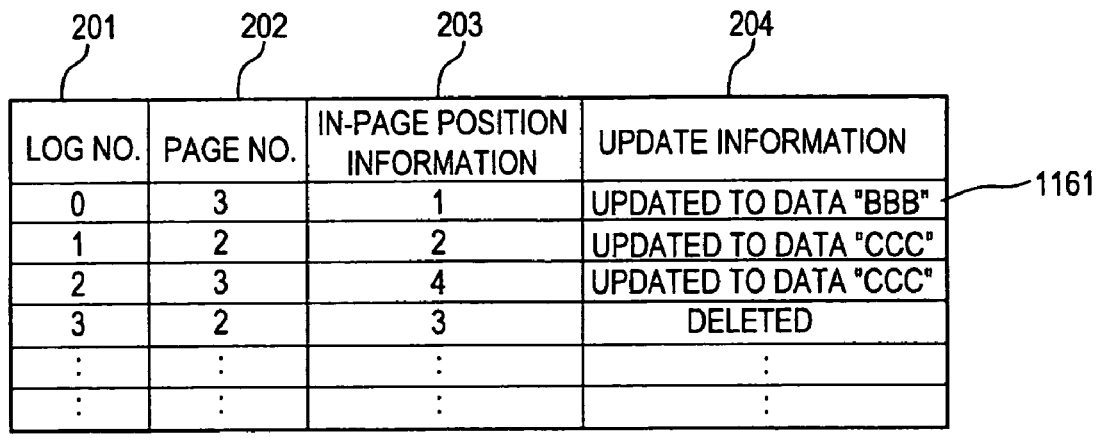
FIG. 3 is a table showing contents of log data.

FIG. 3 shows the structures of the logs 106 and 116. Each of the logs 106 and 116 includes a log number 201 indicating a log identifier (e.g., LSN=log sequence number), a page number 202 as one of units by which the primary DBMS 101 and the secondary DBMS 111 manage the primary DB 107 and the secondary DB 117, in-page position information 203 which is a management unit below the page number 202, and update information 204 indicating an update difference for data indicated by the in-page position information 203. The log number 201 is provided by the primary DBMS 101.

The primary DBMS 101 manages the primary DB 107 based on the in-page position information 203 and the page number 202, and writes update contents as the update information 204 in the log 106 of the primary storage system 103. The log 106 of the primary storage system 103 is transferred to the secondary storage system 113 by remote-copying, and stored as a log 116, and the logs 106 and 116 of the primary and secondary storage systems remain in a synchronized state.

The log application control unit 140 of the secondary server 110 reads the log data 1161 from the backed-up log 116 to identify relevant data among data of the secondary DB 117 to which the log 116 is applied based on the page number 202 and the in-page position information 203.

Figure 4:
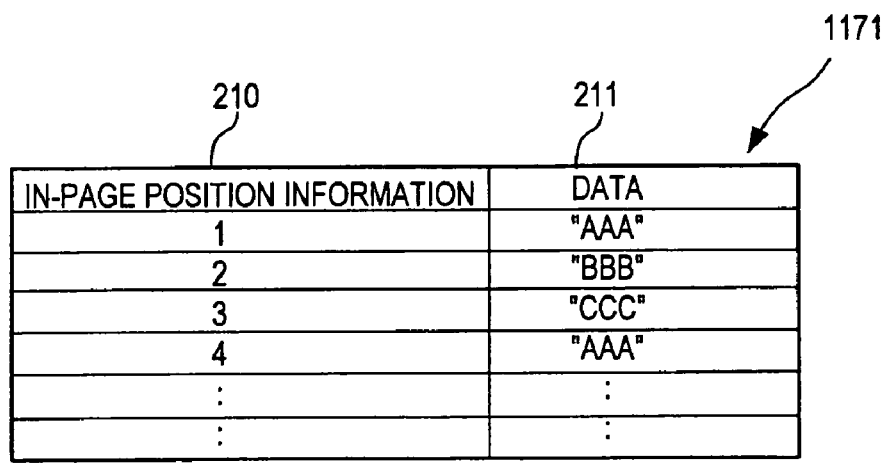
FIG. 4 is a table showing page contents of a database.

Referring to FIG. 4, the page of each of the primary DB 107 and the secondary DB 117 includes in-page position information 210 and data 211 for storing real data. For example, one page is several kilo bytes, and the data 211 is stored for each in-page position information 210.

Upon acquisition of the page number 202 and the in-page position information 203 from the log 116, the log application control unit 140 reads a relevant page from the secondary DB 117 in the cache area 143 by a page unit, applies the update information 204 of the log 116, and updates contents of the secondary DB 117 to be identical with those of the primary DB 107. The page 1171 updated in the cache area 143 is written in the secondary storage system 113 at a predetermined timing. The writing timing of the updated page can be decided by a desired write-through or write-back method.

<Details of Processing>

Hereinafter, an example of a log application process carried out by the log application control unit 140 and the log reference unit 141 will be described.

Figure 5:
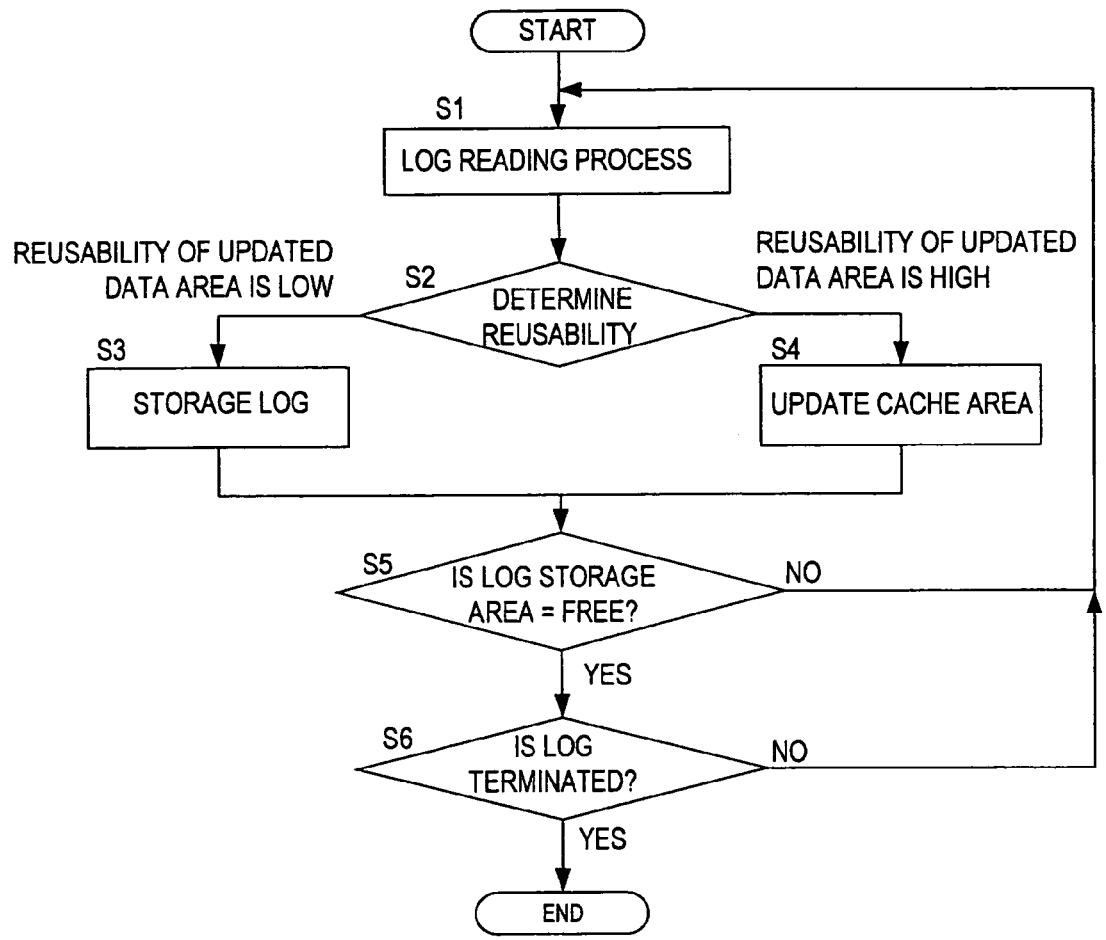
FIG. 5 is a flowchart showing an example of a log application process carried out in a log application control unit and a log reference unit.

FIG. 5 is a flowchart of an overall process executed for each predetermined timing of log application.

Referring to FIG. 5, a step S1 and a step S6 are steps executed by the log reference unit 141, and steps S2 to S5 are steps executed by the log application control unit 140.

First, the log reference unit 141 reads log data 1161 next to the last read data of the log number 201 in the log storage area 142, and then determines high/low reusability of the log data 1161 in the step S2. If reusability of a page 1171 indicated by the log data 1161 is high, the process proceeds to the step S4 to update the page 1171 in the cache area 143 based on the log data 1161.

On the other hand, if the reusability of the page 1171 indicated by the log data 1161 is low, the process proceeds to the step S3 to store the log data 1161 until there is no more free space in the log storage area 142.

After the step the step S3 or S4, to determine an end of the log application process, determination is made as to a state of no log data 1161 in the log storage area 142 and termination of the log 116 in the steps S5 and S6. If one of the steps S5 and S6 is NO, the process returns to the step S1 to read next log data 1161. If both are YES, the current log application process is finished.

Figure 6:
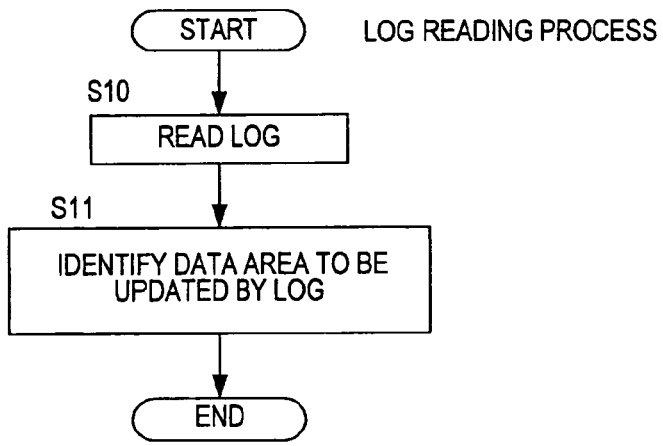
FIG. 6 is a flowchart showing an example of a log reading process carried out in a step S1 of FIG. 5.

FIG. 6 shows a subroutine of the log reading step S1. In a step S10, the log reference unit 141 reads log data 1161 of one entry from the log 116 of the secondary storage system 113. In a step S11, a data area (page number 202 of FIG. 3) of this log data 1161 is identified, and the subroutine is finished to return to the process of FIG. 5.

Figure 7:
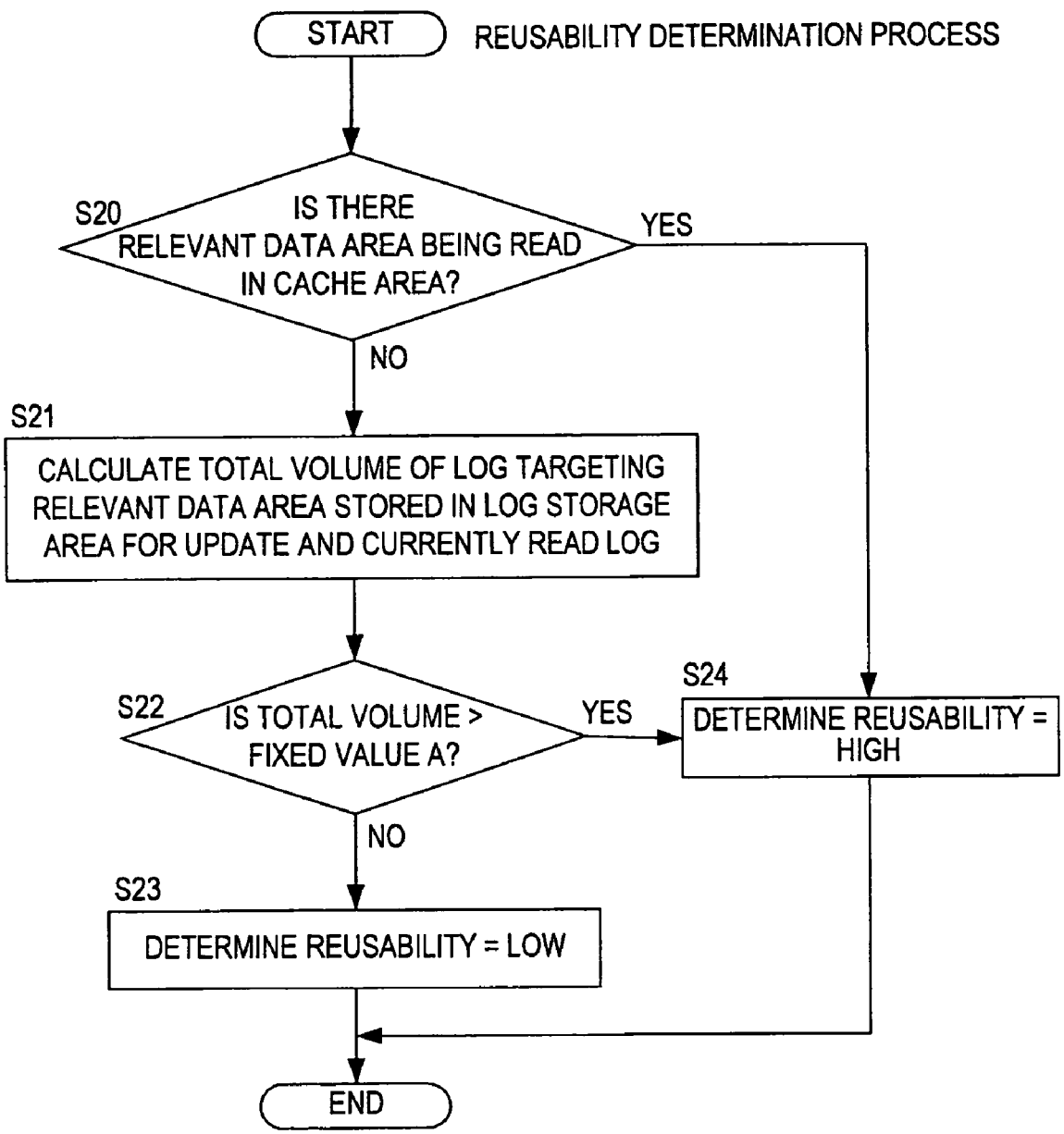
FIG. 7 is a flowchart showing an example of a determination process of reusability carried out in a step S2 of FIG. 5.

FIG. 7 shows the reusability determination step S2 of FIG. 5. First, in a step S20, determination is made as to whether there is a page 1171 corresponding to the page number 202 identified in FIG. 6 or not in the cache area 143. If there is a page 1171 corresponding to the page number 202 in the cache area 143, the process proceeds to a step S24 to determine high reusability of the page 1171. On the other hand, if there is no page 1171 corresponding to the page number 202 in the cache area 143, the process proceeds to a step S21.

In the step S21, for the log data 1161 stored in the log storage area 142, a total volume of all log data 1161 having page numbers similar to the currently read page number 202 and the currently read log data 1161 is calculated.

In a step S22, the total volume obtained in the step S21 is compared with a preset fixed value A. If the total volume is larger than the fixed value A, the process proceeds to the step S24 to determine high reusability. If the total volume is equal to/less than the fixed value A, the process proceeds to a step S23 to determine low reusability, and the subroutine is finished to return to the process of FIG. 5. The fixed value A is set by a manager or a user through the user terminal 160 or the like, and set to, e.g., a value equal to a volume of the page 1171.

In other words, if there is a page 1171 corresponding to the page number 202 stored in the cache area 143, the page number 202 is determined to be a data area of high reusability. Even if there is no corresponding page 1171 in the cache area 143 at present, as long as the total volume of log data 1161 having the same page number 202 in the log storage area 143 is larger than the fixed value A, reusability of the page 202 is determined to be high.

On the other hand, if there is no page 1171 corresponding to the page number 202 of the read log data 1161 in the cache area 143, or if the total volume of the log data 1161 having the same page number 202 is equal to/less than the fixed value A, reusability is determined to be low.

Then, in the step S2 of FIG. 5, according to the determination result of the steps S23 or S24, the process proceeds to the log storage step S3 if the reusability is low, and to the cache area update step S4 if the reusability is high.

Figure 8:
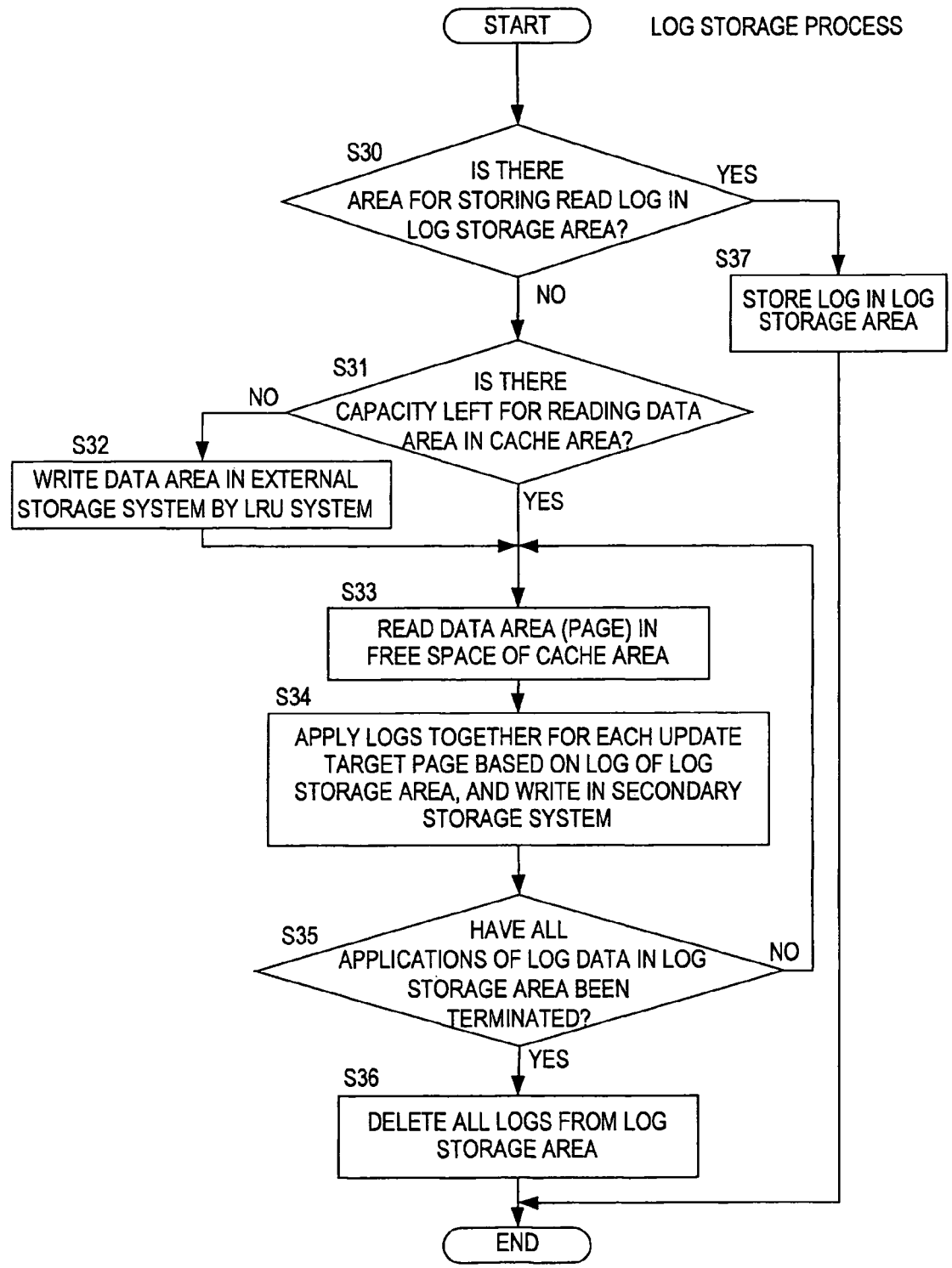
FIG. 8 is a flowchart showing an example of a log storage process carried out in a step S3 of FIG. 5.

FIG. 8 shows a subroutine of the log storage step S3 of FIG. 5. First, in a step S30, determination is made as to whether there is a free space or not for storing the currently read log data 1161 in the log storage area 142. If there is a free space, the process proceeds to a step S37 to store the currently read log data 1161 in the log storage area 142, and the subroutine is finished.

On the other hand, if there is no free space in the log storage area 142, the process proceeds to a step S31 to determine whether there is a free space for reading a page 1171 (data storage area) or not in the cache area 143. If there is a free space in the cache area 143, the process directly proceeds to a step S33. If there is no free space in the cache area 143, the process proceeds to a step S32 to rewrite a page 1171 of a longest unused time by the LRU system from the cache area 143 in the secondary DB 117 of the secondary storage system 113, thereby securing a free space in the cache area 143, and then proceeds to the step S33.

In the step S33, a data area (page 1171) corresponding to the page number 202 of the log data 1161 is read from the secondary DB 117 in the free space of the cache area 143.

Then, in a step S34, all the log data 1161 corresponding to the page 1171 read in the step S33 in the log storage area 142 are sequentially applied to update the pages 1171 altogether in the cache area 143, and the updated pages 1171 are written in the secondary DB 117 of the secondary storage system 113.

Subsequently, in a step S35, determination is made as to completion of log application for all the log data 1161 in the log storage area 142. If there is log data 1161 which has not been applied, the process returns to the step S33. If there are a plurality of log data 1161 corresponding to the same page 1171, the log data 1161 are sequentially applied in the cache area 143 to update the data.

Upon update completion of the page 1171 for all the log data 1161 in the log storage area 142, all the log data 1161 in the log storage area 142 are deleted in a step S36 to finish the subroutine.

In other words, in the subroutine of the log storage process, the log data 1161 is read until there is no more free space in the log storage area 142. At a point of time when there is no more free space, the log data 1161 in the log storage area 142 is applied to the secondary DB 117 to update the same.

At the time of this log application, for example, a free space of one page is secured by using a free space of the cache area 143 (secured by the LRU system if there is no free space in the cache area 143), and the log data 1161 of the log storage area 142 corresponding to the same page are sequentially applied. In the case of this log application, to reduce the number of I/O times in the secondary storage system 113, the logs of the same page number 202 are applied altogether. For example, if log data 1161 similar to those of FIG. 3 have been stored in the log storage area 142, a corresponding page 1171 is read in the cache area 143 for a page number 202=3 of first read log data 1161 of a log number 201=0. Then, for the log data 1161 of the log number 201=0, a relevant page (page number=3) of the cache area 143 is updated based on target in-page position information=1 and update information 204 ("BBB"). Subsequently, log data 1161 (log number 201=2) of the same page number=3 is read, and the log is applied to a relevant page 1171 in the cache area 143 to update the data.

Upon the end of the log application for the same page number=3, the relevant page 1171 in the cache area 143 is rewritten in the secondary storage system 113, and next log data 1161 (log number 1, and page number=2) are similarly applied for pages altogether.

Through the operation, if there is a free space for one page in the cache area 143, log application can be executed for the log data 1161 of low reusability by a minimum number of I/O times.

Figure 9:
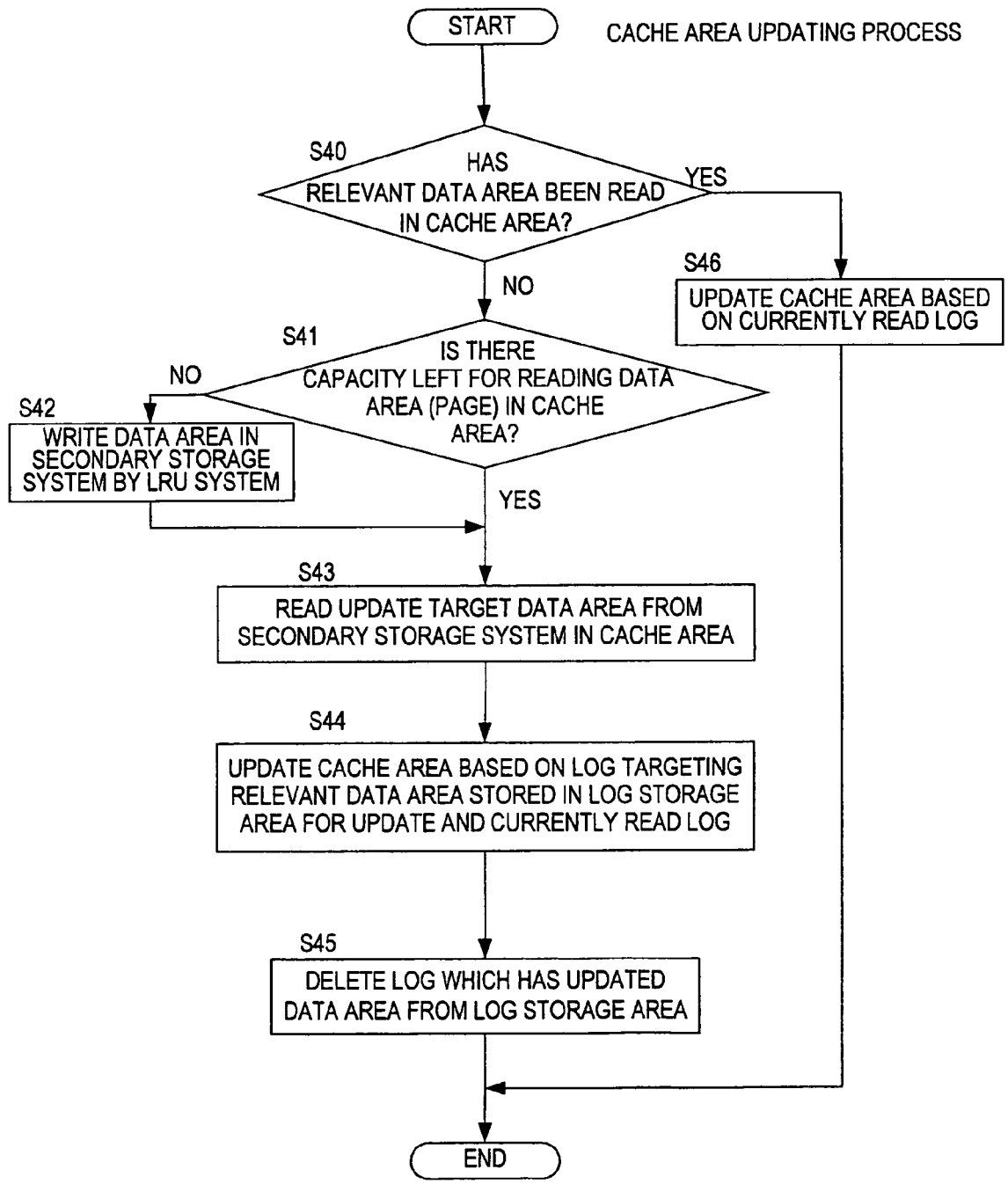
FIG. 9 is a flowchart showing an example of a cache area update process carried out in a step S4 of FIG. 5.

FIG. 9 shows a subroutine of the cache area update step S4 of FIG. 5. First, in a step S40, determination is made as to whether there is a page 1171 corresponding to the page number 202 of the currently read log data 1161 or not in the cache area 143. If there is a page 1171 corresponding to the page number 202 in the cache area 143, the process proceeds to a step S46 to apply the log data 1161 to the page 1171 to update the cache area 143.

On the other hand, if there is no page 1171 corresponding to the page number 202 of the read log data 1161 in the cache area 143, the process proceeds to a step S41 to determine whether there is a free space or not for reading a data area (page 1171) in the cache area 143.

If there is a free space in the cache area 143, the process proceeds to a step S43. If there is no free space, the process proceeds to a step S42 to write one page in the secondary storage system 113 by the LRU system, thereby securing a free space.

In the step S43, a page 1171 to be updated is read in the cache area 143. Then, in a step S44, as in the case of the steps S34 and S35 of FIG. 8, if there are other log data 1161 having the same page number 202 as that of the currently read log data 1161, all the relevant log data 1161 in the log storage area 142 are sequentially applied to the page 1171 to update the same.

Then, after the log data 1161 of the same page number 202 in the log storage area 142 have been applied, the application-completed log data 1161 are deleted from the log storage area 142 to finish the subroutine.

In other words, if there is a page 1171 corresponding to the page number 202 of the currently read log data 1161 in the cache area 143, the log data 1161 is applied to update the page 1171.

On the other hand, if there is no page 1171 corresponding to the page number 202 of the log data 1161 in the cache area 143, a relevant page 1171 is read from the secondary DB 117 of the secondary storage system 113 into a free space of the cache area 143.

Then, a search is carried out for log data 1161 having the same page number 202 as that of the currently read log data 1161 in the log storage area 142. If there is log data 1161 having the same page number 202 in the log storage area 142, the log data 1161 and the currently read log data 1161 are applied to the relevant page 1171 in the cache area 143 to update the same. Accordingly, a plurality of log data 1161 can be applied by one reading to the page 1171 read from the secondary DB 117 of the secondary storage system 113 in the cache area 143. Thus, it is possible to reduce the number of I/O times relating to the secondary storage system 113 from the secondary server 110.

As described above, according to this invention, when the backed-up log 116 is applied from the primary site 1 to the secondary DB 117, the applied log data 1161 are sequentially read from the log 116 of the secondary storage system 113. Then, reusability of the page 1171 read in the cache area 143 of the secondary server 110 is determined from the page number 202 of each log data 1161. The page 1171 of high reusability is read in the cache area 143, and the log data 1161 is applied.

Even in the case of the page 1171 whose reusability is determined to be high, if it is not present in the cache area 143, a free space is created by the LRU system or the like, and the log data 1161 is applied to the page 1171 in this free space. In this log application, log application is carried out even for the log data 1161 of the log storage area 142 having the same page number 202 as that of the currently read log data 1161. Thus, a plurality of log data 1161 can be applied by a single reading operation from the secondary storage system 113, and it is possible to greatly reduce the number of reading/writing times of the page 1171 which becomes random access at the secondary storage system 113.

On the other hand, if reusability is determined to be low, the log data 1161 is stored in the log storage area 142. At a point of time when there is no more free space in the log storage area 142, log application to the page 1171 of low reusability starts.

For the log application of the page 1171 with low reusability, a predetermined capacity (e.g., one page) of the cache area 143 is set as a free space by the LRU system or the like, the page 1171 is read in this free space, the currently read log data 1161 and the log data 1161 having the same page number 202 in the log storage area 142 are applied collectively to the page 1171 read in the cache area 143 to update the same, and the page is rewritten in the secondary DB 117 of the secondary storage system 113. Accordingly, a plurality of log data 1161 can be applied by one page reading/writing from the secondary storage system 113, thereby greatly reducing the number of I/O times in the secondary storage system 113. Moreover, it is possible to efficiently use the finite cache area 143.

The log storage area 142 is provided in the memory 119 of the secondary server 110 in addition to the cache area 143, the log data 1161 having the page number 202 of low reusability is stored until there is no more free space in the log storage area 142, whereby a ratio of the log data 1161 of the same page number 202 to be updated can be increased. Thus, it is possible to apply the log data 1161 having the same page number collectively.

Figure 11:
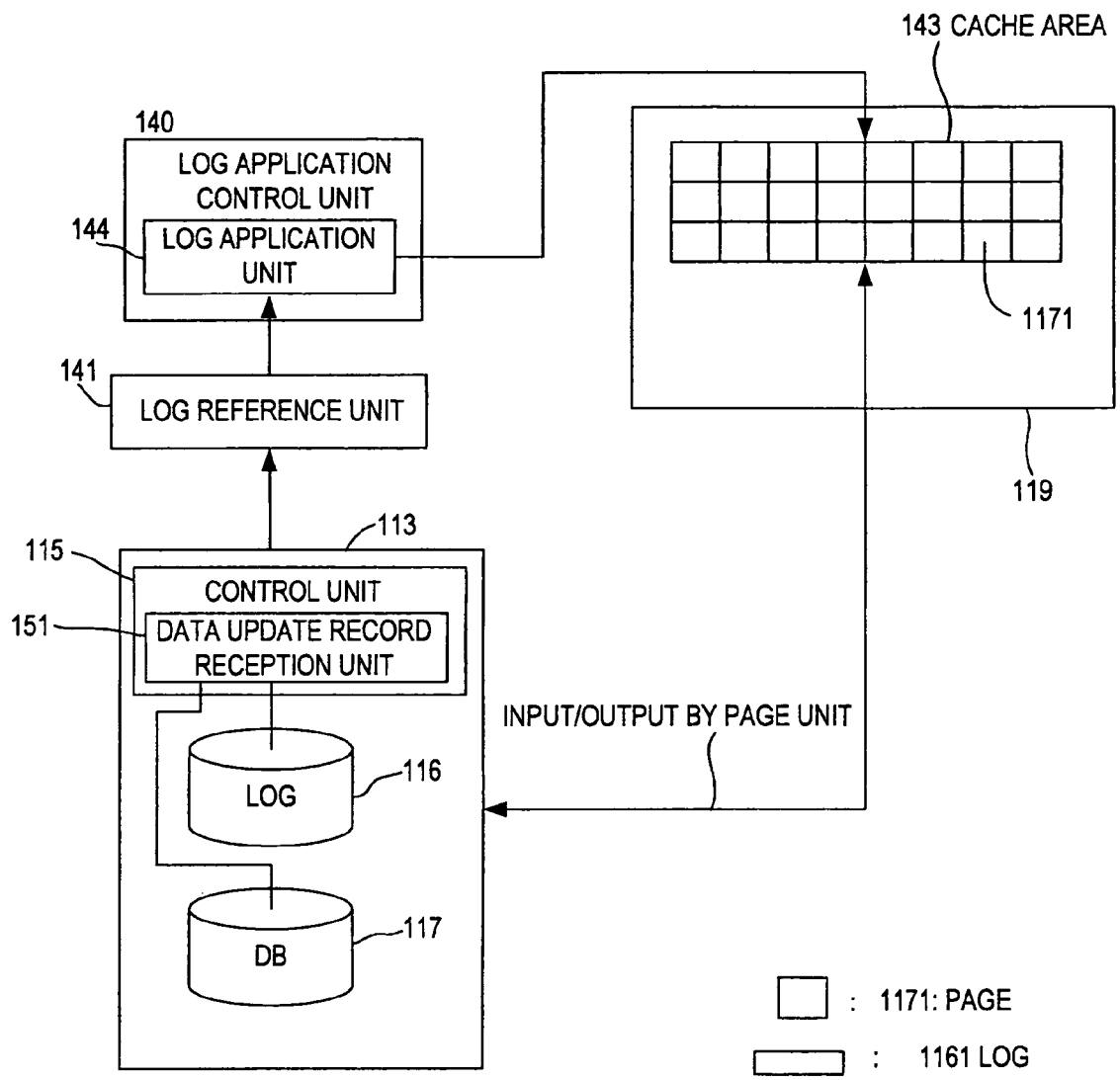
FIG. 11 is an explanatory diagram of a log application process, showing an example in which there is no log storage area.

FIG. 11 shows a case of no log storage area 142. In log application of the case of FIG. 11, logs 116 are sequentially read from the secondary storage system 113, and log data 1161 are applied one by one to the page 117 of the cache area 143 to update the same. At this time, if there is no relevant page 1171 in the cache area 143, a page is read from the secondary storage system 113 by random access. Then, if page numbers 202 indicated by next log data 1161 and its next log data 1161 are different, random access occurs at the secondary storage system 113 for each log data 1161. Further, even if the LRU is used in the cache area 143, depending on an arrangement of log data 1161, the page 1171 of high reusability ends up being rewritten in the secondary DB 117 of the secondary storage system 113. Thus, the secondary storage system 113 with high access performance and a high reading speed becomes necessary.

On the other hand, according to this invention, as shown in FIG. 2, the reusability of the sequentially read log data 1161 is determined, the log data with low reusability is temporarily stored in the log storage area 142, and only the log data of high reusability is read in the cache area 143 to execute log application. Thus, only the pages with high reusability are stored in the cache area 143, whereby the number of I/O times in the secondary storage system 113 can be greatly reduced in proportion to that shown in FIG. 11.

When there is no more free space in the log storage area 142, only a predetermined area (e.g., one page) of the cache area 143 is set as a free space by the LRU system or the like. In this free space, the log data 1161 of the same page number 202 are applied collectively to the page 1171 with low reusability stored in the log storage area 142, and the page is rewritten in the storage system 113. This process is carried out for all the log data 1161 in the log storage area 142. Subsequently, the log storage area 142 is emptied, and new log data 1161 (reusability=low) is stored. Accordingly, the page 1171 of low reusability uses only the predetermined area of the cache area 143, while other areas still hold the pages 1171 with high reusability, whereby the number of I/O times in the secondary storage system 113 can be reduced more greatly in comparison to that of FIG. 11. Moreover, by storing the pages 1171 of low reusability in the log storage area 142, the ratio of the log data 1161 having the same page number 202 (ratio of the number of data of the same page number as that of a total number of data of the log storage area 142) can be increased, and a plurality of log data 1161 can be applied by a single reading of the page 1171. Thus, it is possible to reduce the number of I/O times in the secondary storage system 113 more greatly in comparison to that of FIG. 11.

Thus, according to this invention, by greatly reducing the number of I/O times in the secondary storage system 113, especially random access, the secondary storage system 113 can be constituted of a low-performance device. As a result, it is possible to reduce introduction and normal-time operation's costs of the secondary site 2 which is a backup system.

Figure 10:
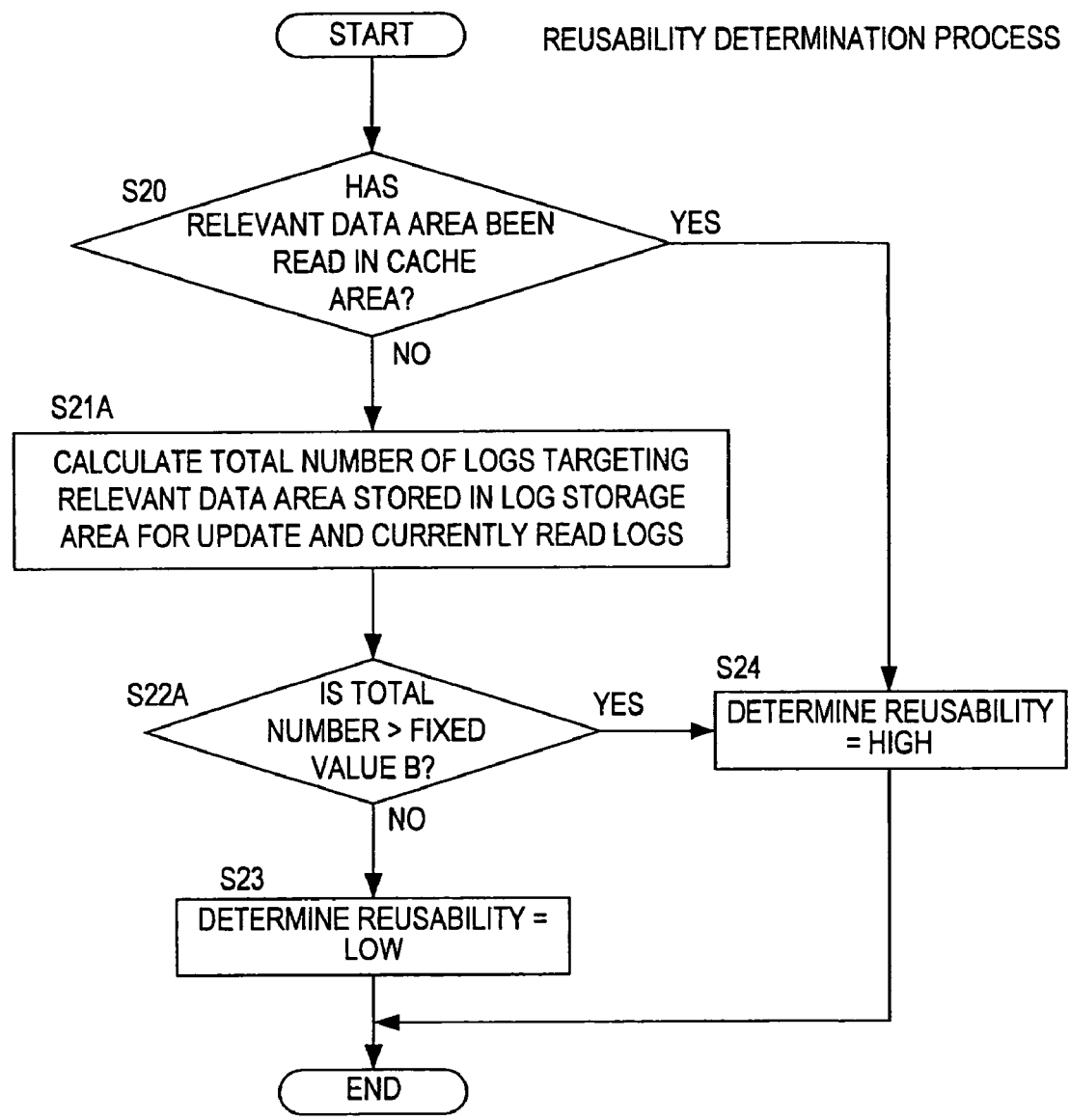
FIG. 10 is a flowchart showing another example of a determination process of reusability carried out in the step S2 of FIG. 5.

FIG. 10 shows another example of a reusability determination process of FIG. 7. Instead of the volume of the log data 1161, high/low reusability of the same page 202 is determined based on the number of log data 1161. Other components are similar to those of FIG. 7.

In the step S20, as in the case of FIG. 7, determination is made as to whether a page 1171 corresponding to a page number 202 determined based on the currently read log data 1161 exists or not in the cache area 143. If a page 1171 corresponding to the page number 202 exists in the cache area 143, the process proceeds to the step S24 to determine high reusability of the page 1171 as in the case of FIG. 7. On the other hand, if a page 1171 corresponding to the page 202 does not exist in the cache area 143, the process proceeds to a step S21A.

In the step S21A, for log data 1161 stored in the log storage area 143, a total number of all the log data 1161 having the same page number as that of the currently read page number 202 and the number of currently read log data 1161 is calculated.

In a step S22A, the total number obtained in the step S21A is compared with a preset fixed value B (second value). If the total number is larger than the fixed value B, the process proceeds to the step S24 to determine high reusability. If the total is equal to/less than the fixed value B, the process proceeds to the step S23 to determine low reusability, the subroutine is terminated, and the process returns to that of FIG. 5. In this case, as in the case of FIG. 7, reusability can be accurately determined.

The number of I/O times in the secondary storage device 113 can be decreased by properly changing the fixed values A and B and the capacity of log storage area 143 depending on a volume of each page 1171, the kind of primary DB 107, or a provided transaction. The fixed values A and B and the capacity of the log storage area 143 can be changed from the user terminal 160 via the parameter reception unit 145 of the secondary server 110.

Figure 12:
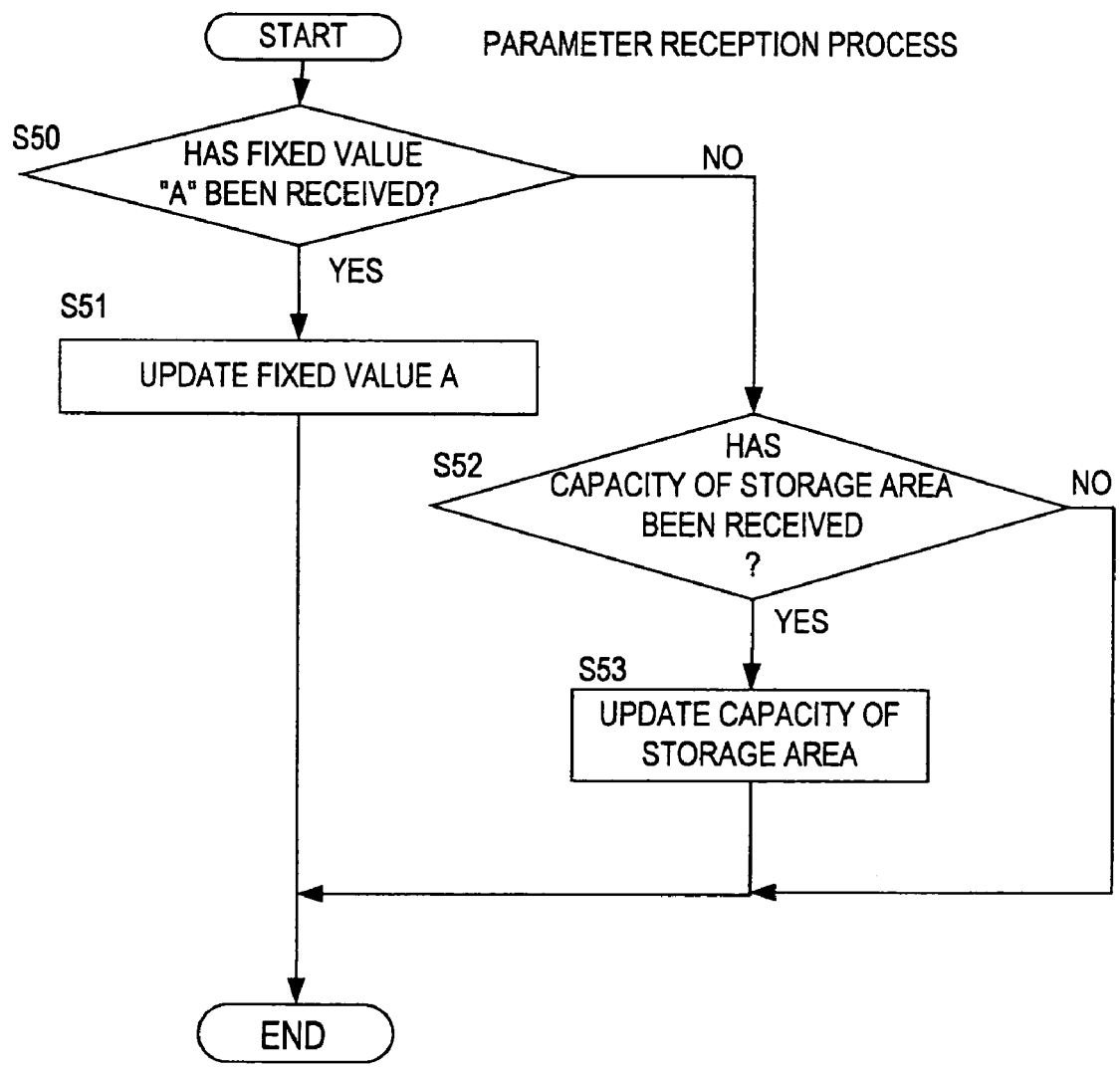
FIG. 12 is a flowchart showing an example of a process carried out in a parameter reception unit.

FIG. 12 is a flowchart showing an example of a process executed by the parameter reception unit 145. This process is carried out when a command is received from the user terminal 160 via the network 120.

In a step S50, determination is made as to whether a received content is a fixed value A or not. If it is a fixed value A, the process proceeds to a step S51 to update the fixed value A. On the other hand, if the received content is not a fixed value A, the process proceeds to a step S52 to determine whether the received content is a capacity of the log storage area 142 or not. If the content is a capacity of the log storage area, the process proceeds to a step S53 to change the capacity of the log storage are 142. The capacity changing of the log storage area 142 is carried out when the log application unit 144 is not performing an operation on the log storage area 142.

The embodiment has been described by way of example in which this invention is applied to a disaster recovery. However, the invention can be applied to a backup system (computer system) for updating a secondary DB 117 of a secondary site 2 based on a log.

According to Claim 1, a cache area update step includes a step of reading, when there is no data storage area to be updated by the log in the cache area, a relevant data area of the cache area from the storage system, and then applying collectively, logs stored in the log storage area, those logs targeting the same data storage area for update, to update the data storage area.

According to Claim 8, a cash area update unit reads, when there is no data storage area to be updated by the log in the cache area, a relevant data storage area of the cache area from the storage system, and collectively, applies logs stored in the log storage area targeting the same data storage area for update to update the data storage area.

According to Claim 15, a cache area update procedure reads, when there is no data storage area to be updated by the log in the cache area, a relevant data storage area of the cache area from the storage system, and applies logs stored in the log storage area targeting the same data storage area for update altogether to update the data storage area.

As apparent from the foregoing, this invention can be applied to a disaster recovery system employed in financial businesses or by large corporations to suppress introduction and operation costs of secondary sites.

While the present invention has been described in detail and pictorially in the accompanying drawings, the present invention is not limited to such detail but covers various obvious modifications and equivalent arrangements, which fall within the purview of the appended claims.

What is claimed is:

1. A backup method of causing a secondary server having a memory including a cache area for storing a copy of a page identified in a secondary database (DB), and causing a database management system (DBMS) of a secondary site to receive a log from a primary site and apply the log to the secondary DB to generate a copy of a primary DB of the primary site, the secondary site including the secondary DB, and a secondary storage system for holding the log, which is a data update difference, and backup data, and the DBMS for updating the secondary DB based on the log executed in the secondary server and applied to the page identified in the secondary DB, the method comprising:

a log reading step of reading, by a computer comprising a processor, the log received from the primary site and identifying the page, which is targeted to be updated in the secondary DB by the log;

a reusability determination step of determining high reusability or low reusability of the page identified in the secondary database, wherein reusability indicates a frequency of access to the page identified in the secondary DB when the log is applied to the backup data;

a log storage step of storing the log received from the primary site in a preset log storage area when the log received from the primary site corresponds to a page determined to be low in reusability, updating, after storing the log received from the primary site, the page indicated by the log in the preset log storage area, and writing the updated page to the backup data; and a cache area update step of updating the page identified in the secondary database and stored in the cache area by applying the log received from the primary site to the page identified in the secondary database and stored in the cache area when the log received from the primary site corresponds to a page determined to be high in reusability, wherein the reusability determination step comprises:

determining whether there is a page targeted to be updated by the log in the cache area, wherein when there is a page targeted to be updated by the log in the cache area, the reusability is determined to be high, and wherein when there is no page targeted to be updated by the log in the cache area, the reusability determination step further comprises:

calculating a total value of a volume of logs which are stored in the log storage area and which target a page identical to the page targeted to be updated by the log and a volume of the received log, wherein when the total value is larger than a preset first value, the reusability is determined to be high, and wherein when the total value is equal to or less than the preset first value, the reusability is determined to be low.

2. A backup method of causing a secondary server having a memory including a cache area for storing a copy of a gage identified in a secondary database (DB), and causing a database management system (DBMS) of a secondary site to receive a log from a primary site and apply the log to the secondary DB to generate a copy of a primary DB of the primary site, the secondary site including the secondary DB, and a secondary storage system for holding the log, which is a data update difference, and backup data, and the DBMS for updating the secondary DB based on the log executed in the secondary server and applied to the page identified in the secondary DB, the method comprising:

a log reading step of reading, by a computer comprising a processor, the log received from the primary site and identifying the page, which is targeted to be updated in the secondary DB by the log;

a reusability determination step of determining high reusability or low reusability of the page identified in the secondary database, wherein reusability indicates a frequency of access to the page identified in the secondary DB when the log is applied to the backup data;

a log storage step of storing the log received from the primary site in a preset log storage area when the be received from the primary site corresponds to a page determined to be low in reusability, updating, after storing the log received from the primary site, the page indicated by the log in the log storage area, and writing the updated page to the backup data; and a cache area update step of updating the page in the cache area by applying the log received from the primary site to the pace identified in the secondary database and stored in the cache area when the log received from the primary site corresponds to a page determined to be high in reusability, wherein the reusability determination step comprises:

determining whether there is a page targeted to be updated by the log in the cache area;

wherein when there is a page targeted to be updated by the log in the cache area, the reusability is determined to be high, and wherein when there is no page targeted to be updated by the log in the cache area, the reusability determination step further comprises:

calculating a quantity of logs stored in the log storage area to target a page identical to the page targeted to be updated by the log and the quantity of logs, wherein when the total value is larger than a preset second value, the reusability is determined to be high, and wherein when the quantity is equal to or less than the preset second value, the reusability is determined to be low.

3. The backup method according to claim 1, further comprising:

receiving, by the DBMS, the preset first value or a capacity of the log storage area; and changing, by the DBMS, the preset first value upon reception of the preset first value, and the capacity of the log storage area upon reception of the capacity.

4. The backup method according to claim 2, further comprising:

receiving, by the DBMS, the preset second value or a capacity of the log storage area; and changing, by the DBMS, the preset second value upon reception of the second value, and the capacity of the log storage area upon reception of the capacity.

5. The backup method according to claim 1, wherein the log storage step comprises:
applying all logs in the log storage area to the backup data when there is no more free space in the log storage area; and
deleting the logs stored in the log storage area.

6. The backup method according to claim 5, wherein the step of applying all the logs in the log storage area to the backup data comprises applying logs stored in the log storage area to target, for update, the identical page all together after a page equivalent to a predetermined area of the cache area is read from a storage system, and updating the page.

7. A database management system (DBMS) of a secondary site that receives a log from a primary site and applies the log to a secondary database (DB) to generate a copy of a primary DB of the primary site, the secondary site including the secondary DB, a secondary storage system for holding the log, which is a data update difference, a secondary server having a memory including a cache area for storing a copy of a page identified in the secondary DB, and the DBMS for updating the secondary DB based on the log executed in the secondary server and applied to the page identified in the secondary DB, the DBMS comprising:
a log reception unit that receives the log from the primary site, wherein the log is a data update difference;
a storage system that stores the log and backup data;
a log application control unit that applies the log to the backup data and updates the backup data;
a log reference unit that reads the log from the storage system;
a cache area set on a memory to store the backup data for each page; and
a log storage area set on the memory to store the log, and
wherein the log application control unit comprises:
a reusability determination unit that determines high reusability or low reusability of the page targeted to be updated by the log read by the log reference unit;
a log storage unit that stores the log received from the primary site in the log storage area when the log received from the primary site corresponds to a page determined to be low in reusability; and
a cache area update unit that applies the log received from the primary site to a page of the cache area when the log received from the primary site corresponds to a page determined to be high in reusability, and that updates the page,
wherein the reusability determination unit comprises:
a first determination unit that determines whether there is a page targeted to be updated by the log in the cache area; and
a capacity calculating unit,
wherein when there is a page targeted to be undated by the log in the cache area, the first determination unit determines the reusability to be high, and
wherein when there is no page targeted to be updated by the log in the cache area, the capacity calculating unit calculates a total value of a volume of a log stored in the log storage area to target a page identical to the page targeted to be updated by the log and a volume of the received log; and
a second determination unit,
wherein when the total value is larger than a preset first value, the second determination unit determines reusability to be high, and
wherein when the total value is equal to or less than the preset first value, the second determination unit determines the reusability to be low.

8. A backup system having a secondary server having a memory including a cache area for storing a copy of a page identified in a secondary DB, and a database management system (DBMS) of a secondary site that receives a log from a primary site and applies the log to a secondary database (DB) to generate a copy of a primary DB of the primary site, the secondary site including the secondary DB, and a secondary storage system for holding the log, which is a data update difference, and the DBMS for updating the secondary DB based on the log executed in the secondary server and applied to the page identified in the secondary DB, the DBMS comprising:
a backup computer,
wherein the backup computer comprises:
a log reception unit that receives a log which is a data update difference;
a storage system that stores the log and backup data;
a log application control unit that applies the log to the backup data and updates the backup data;
a log reference unit that reads the log from the storage system;
a cache area set on a memory to store the backup data for each page; and
a log storage area set on the memory to store the log, and
wherein the log application control unit comprises:
a reusability determination unit that determines high reusability or low reusability of the page targeted to be updated by the log read by the log reference unit;
a log storage unit that stores the log received from the primary site in the log storage area when the log received from the primary site corresponds to a page determined to be low in reusability; and
a cache area update unit that applies the log received from the primary site to the page identified in the secondary database and stored in the cache area when the log received from the primary site corresponds to a page determined to be high in reusability, and updates the page,
wherein the reusability determination unit comprises:
a first determination unit that determines whether there is a page targeted to be updated by the log in the cache area; and
a capacity calculating unit,
wherein when there is a page targeted to be updated by the log in the cache area, the reusability is determined to be high,
wherein when there is no page targeted to be updated by the log in the cache area, the capacity calculating unit calculates a quantity of logs stored in the log storage area to target a page identical to the page targeted to be updated by the log and the quantity of the logs; and
a second determination unit,
wherein the second determination unit determines reusability to be high when the quantity is larger than a preset first value, and
wherein the second determination unit determines reusability to be low when the total value is equal to or less than the preset first value.

9. The backup system according to claim 7, wherein the log application control unit comprises:
a parameter reception unit that receives the preset first value or a capacity of the log storage area; and
a setting changing unit that changes the preset first value when the parameter reception unit receives the second value, and the capacity of the log storage area when the parameter reception unit receives the capacity.

10. The backup system according to claim 8, wherein the log application control unit comprises:
- a parameter reception unit that receives the second value or a capacity of the log storage area; and
- a setting changing unit, that changes the second value when the parameter reception unit receives the second value, and the capacity of the log storage area when the parameter reception unit receives the capacity.

11. The backup system according to claim 7, wherein when there is no more free space in the log storage area, the log storage unit applies all logs in the log storage area to the backup data, and then deletes the logs stored in the log storage area.

12. The backup system according to claim 11, wherein when all the logs in the log storage area are applied to the backup data, the log storage unit applies logs stored in the log storage area to target, for update, the identical page all together after a page equivalent to a predetermined area of the cache area is read from the storage system, and updates the page.

* * * * *